United States Patent
Brid

(10) Patent No.: US 11,001,741 B1
(45) Date of Patent: May 11, 2021

(54) DRILLING FLUID AND METHOD

(71) Applicant: Demetrio Brid, Palmetto Bay, TX (US)

(72) Inventor: Demetrio Brid, Palmetto Bay, TX (US)

( * ) Notice: Subject to any disclaimer, the term of this patent is extended or adjusted under 35 U.S.C. 154(b) by 0 days.

(21) Appl. No.: 16/274,499

(22) Filed: Feb. 13, 2019

(51) Int. Cl.
*C09K 8/08* (2006.01)

(52) U.S. Cl.
CPC ............ *C09K 8/08* (2013.01); *C09K 2208/12* (2013.01)

(58) Field of Classification Search
None
See application file for complete search history.

(56) References Cited

U.S. PATENT DOCUMENTS

| | | | |
|---|---|---|---|
| 2012/0061083 A1* | 3/2012 | Ballard | C09K 8/035 166/305.1 |
| 2016/0264837 A1* | 9/2016 | Nelson | C09K 8/424 |

* cited by examiner

*Primary Examiner* — Jeffrey D Washville
(74) *Attorney, Agent, or Firm* — Law Office of Jeff Williams PLLC; J. Oliver Williams

(57) ABSTRACT

The present invention relates to an aqueous solution for drilling wells in low-gradient formations and is made up of products from three chemical families, namely a high molecular weight polymer mixture, an inhibitor, and an amine mixture. The solution is mixed with a seawater liquid base. The solution substitutes invert emulsion and was designed to control swelling, dispersion, and migration of fine colloidal materials, and the fluid can drill high pressure gradient intervals and be formulated to resolve any challenge presented by the formation. The system with the solution is environmentally-friendly and complies with the required main functions of the drilling fluids while also providing a high inhibition control by swelling and dispersion of clay zones, due to the polymeric nature of the materials with which it is formulated.

14 Claims, 2 Drawing Sheets

DRILLING FLUID AND METHOD

BACKGROUND

1. Field of the Invention

The present application relates to a high performance drilling fluid system for use in drilling oil wells in low pressure gradient formations, and more particularly to a solid free seawater based polymeric drilling fluid with liquid additives for the control of highly reactive argillaceous (clay) zones that can be densified for drilling in high pressure gradient areas. This fluid provides operational continuity while resolving problems associated with lost circulation.

2. Description of Related Art

During the drilling of hydrocarbon-producing wells, several layers of the Earth's crust are drilled in order to reach the depths where these oil and gas deposits are located. These extracts comprise several geological layers, which have different characteristics as far as rock composition, pressures, and temperatures go. To achieve this purpose, drilling fluids are used. The drilling of wells is performed in both terrestrial and maritime locations and the selection and design of fluids must be carried out so as to avoid problems and operational risks, lower operation costs, shorten drilling time, and increase the production of hydrocarbons.

Existing technology that has been used to drill the naturally fractured deposit known as BTPKS (Spanish acronym for Late Cretaceous-Paleocene Transitional Rift) includes the following fluids: Bentonite fluids, Polymeric bentonite fluids, Unweighted or "relaxed" invert emulsion fluids, Low-density direct emulsion fluids, Seawater-based fluid with solid additives, and Seawater-based fluid with liquid additives for low reactivity. An exemplary representation of a well bore with drilling bit is shown in FIG. 1. Fluid used during drilling in such formations, fails to return to the surface and is lost. A concern that exists in particular is the structural integrity of the bore walls. Loss of circulation can lead to collapses of the well bore. Each of the conventional fluids above are discussed below.

Bentonite fluids: This fluid is prepared with drilling (fresh) water as a base, bentonite in solid form, and caustic soda. It has a slow preparation rate, low rheological properties, high filtrates, and low reactive clay control. It was used to drill in areas of total and/or partial circulation loss due to its low cost. However, as a result of its low yield it generated unstable wells with a high probability of mechanical accidents, as well as a lack of operating continuity due to the complexity of the logistics for transporting fresh drilling water to the offshore platform.

Polymeric bentonite fluids: This fluid is similar to the one above, with the advantage that it presents better rheological properties due to the solid polymers in its formulation. Despite this improvement, the fluid does not present the ability to control reactive clay intervals and generates unstable wells with a high probability of mechanical accidents. Like the fluid above, it generated a lack of operating continuity due to the complexity of the logistics of transporting fresh drilling water to the platform.

Unweighted or "relaxed" invert emulsion fluids: This is an invert emulsion fluid with diesel and drilling water as a base that contains emulsifiers, filtrate reducers, asphalt, and brine with calcium hydroxide (slaked lime) in its formulation. This fluid presents good rheological properties and control of low reactivity clay material while generating stable wells during drilling. However, this fluid is not designed to drill areas with total and/or partial circulation loss as its preparation is slow and the logistics of its materials complex. For this reason, operating continuity is not possible under severe loss conditions. It is not environmentally friendly and due to its containing solids and asphalts also causes damage to the production zone. The cost of this fluid is very elevated for drilling in areas with circulation loss due to the inclusion of diesel in its formulation.

Low-density direct emulsion fluid: This fluid includes fresh drilling water, diesel, and an emulsifier in its formulation. It does not form a stable emulsion at formation temperature and pressure, and the resultant free water causes loss of rheological properties and activation of reactive clays. This results in swelling of the formation and reduction of the wellbore. It does not control dispersion of unstable intervals and is a costly system that requires mud ships for the transport of liquids, water, and diesel. In a drilling operation which presents partial or total circulation loss, valuable days are lost due to delays in the drilling schedule cause by cumbersome logistics.

Seawater-based fluid with solid additives: Polymeric seawater systems with solid additives has been used but its preparation was slow given the difficulty in mixing the solid polymers, as the circulation lines tend to become clogged. It presented poor homogenization in its preparation due to the appearance of polymer clots or "fish eyes" which on occasion clogged said circulation lines from reservoirs to drilling pits. Additionally, it was a system that partially inhibited low reactivity clays, with a scope of control up to 20 meq/100 g of said reactive clays.

Seawater-based fluid with liquid additives for low reactivity: There is only one type of seawater-based fluid with liquid additives. This fluid has been used on the Cantarell KU MALOOB ZAAP fields and has complied with the drilling requirements in these fields for partial and total circulation loss. It has good rheological properties, but its scope is limited to clay reactivities of 20 meq/100 g. This fluid has not been used in high pressure gradient formations.

Generally, drilling fluid companies have not been able to design a cost effective drilling fluid able to drill in partial or total circulation loss zones with operating continuity and in formations with highly reactive clay material and those with high pressure gradients.

Although strides have been made with drilling fluids, shortcomings remain. The fluid of the present application is intended to eliminate the current aforementioned problems, to provide a solid free seawater based system that will drill through all of the aforementioned zones while resolving the previously unaddressed problems of highly reactive clays, low ROP (Rate Of Penetration), stuck pipe, formation damage, and cementing of production liners at programmed depth.

SUMMARY OF THE INVENTION

It is an object of the present application to provide a fluid that will drill through highly reactive clay formations that present partial and/or total circulation losses with operating continuity. Such has always been a challenge especially in the Cantarell and adjoining fields in the Gulf of Campeche, Mexico. The fluid of the present application is a solid-free fluid that permits the drilling of productive areas of oil deposits while minimizing damages to the formation. It can also be densified in order to drill in high pressure areas.

As the Gulf of Mexico on the Campeche coast is rich in naturally fractured oil deposits on limestone formations. Geological layers above and below the pay area include Paleocene, Late Cretaceous-Paleocene, Transitional Rift, Early/Middle Cretaceous, Kimmeridgian Jurassic, and Tithonian Jurassic zones. With an extension of approximately 300 Km in length and varying thickness of approximately 80 meters to 400 meters, this natural fracture has a low pressure gradient profile and includes the KU MALOOB ZAAP, AYATSIL, CANTARELL, EK, AND BALAM fields. In order to exploit the deposit, the fracture must be stabilized and drilled. Therefore, a further object of the present application is for the drilling fluid be an inhibited seawater based polymeric fluid, that has all the characteristics required to drill this type of formation. Drilling can be done with partial or total circulation loss.

Another object of the present application is to provide a solid free seawater based system that will drill through all of the aforementioned zones while resolving the previously unaddressed problems of highly reactive clays, low ROP (Rate Of Penetration), stuck pipe, formation damage, and cementing of production liners at programmed depth. It is desired that the fluid complies with all current Mexican environmental regulations, such as CRETIB and LC-50 tests.

Additionally, the fluid will replace diesel based invert emulsions that are significantly more costly and other systems that require cumbersome logistics. The result is that one fluid alone can be used to drill the complete well, including wells with a high pressure gradient.

Another object of the present application is for the fluid to be used to drill and ram in well conductors at Pleistocene and Miocene layers.

Ultimately the invention may take many embodiments. In these ways, the present invention overcomes the disadvantages inherent in the prior art.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
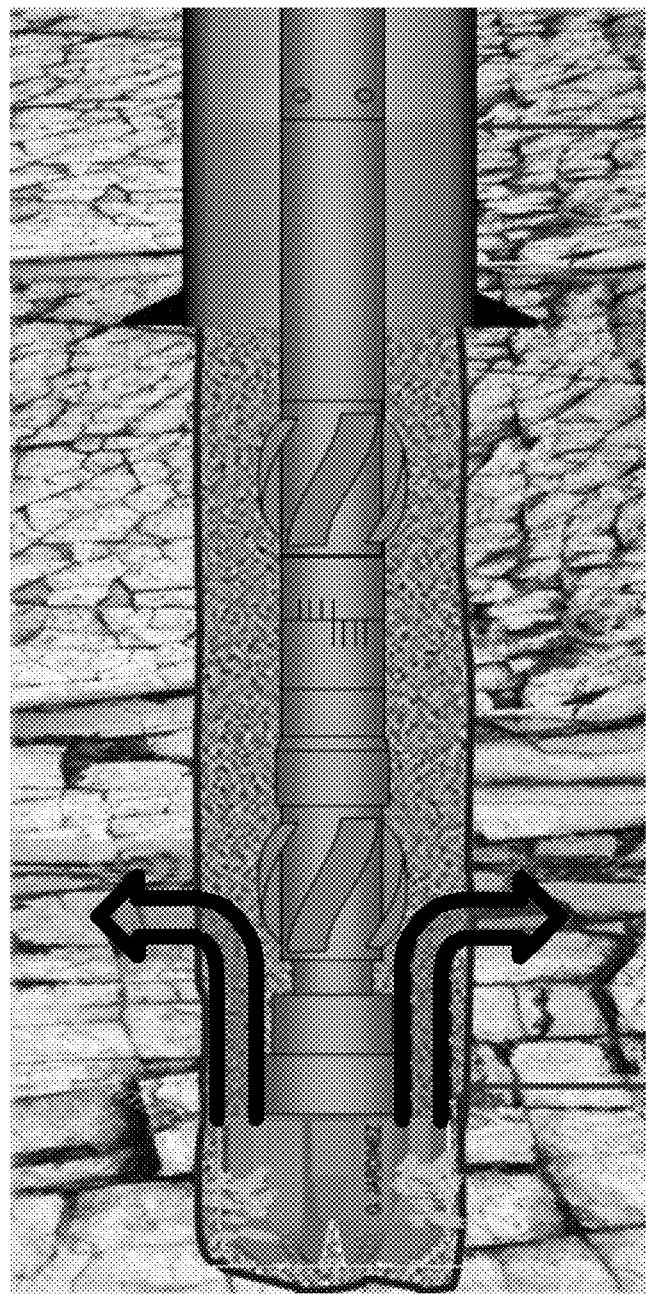
FIG. 1 is a side view of a well bore depicting circulation loss zones during drilling.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The embodiments and method of the present application is illustrated in the associated drawings. The drilling fluid of the present application is a solution made up of products from three chemical families, namely a high molecular weight polymer mixture, an inhibitor, and an amine mixture. Combined, the fluid contains a multifunctional modified polysaccharide with properties such as fluid loss control, viscosity, and encapsulation; a polyglycol that imparts inhibition and lubricity, and an amine mixture to control acid gases. Additional features and functions are illustrated and discussed below.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Figure 2:
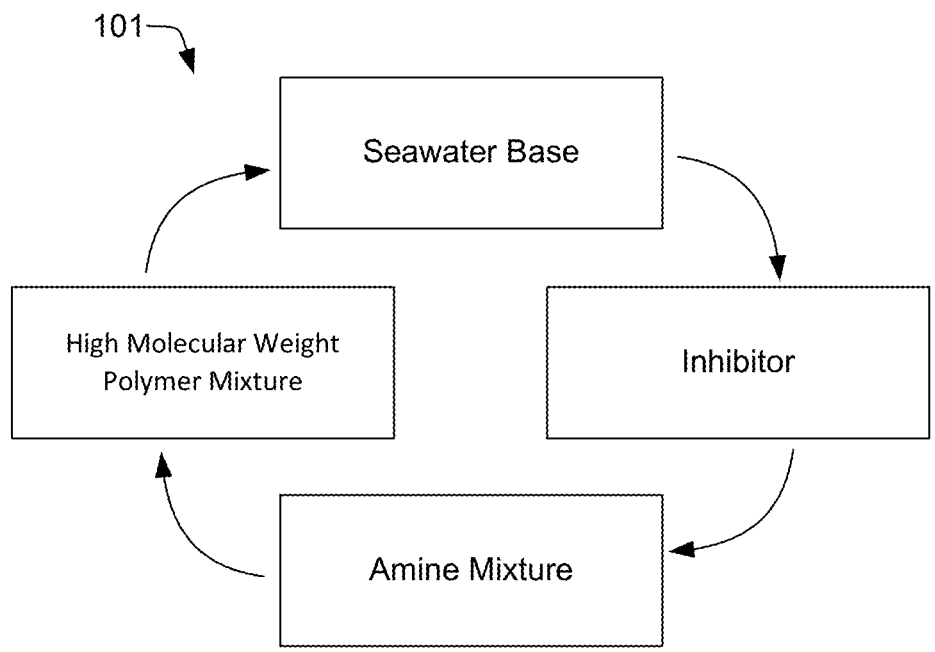
FIG. 2 is a chart of a drilling fluid composed of 3 components according to an embodiment of the present application.

Referring now to FIG. 2 in the drawings, a drilling fluid is illustrated. Drilling fluid 101 is made up of three chemical families including a high molecular weight polymer mixture 103, an inhibitor 105, and an amine mixture 107. These chemical families are a mix of liquid proprietary polymeric and chemical products.

Mixture 103 is a high-molecular weight polymer mixture which includes a multifunctional modified polysaccharide. Mixture 103 exhibits properties such as fluid loss control, generation of viscosity, and encapsulation. Concentration within fluid 101 ranges from 0.5 liters/m3 to 12 liters/m3, depending on the characteristics of the formation.

This mixture of high-molecular weight polymers also generates rheological properties, filtrate reduction, and stabilization of well walls in unstable formations. Mixture 103 can be engineered for deployment according to formation characteristics. This characteristic, along with the chemical modification which allows for multifunctionality, is unique in the industry.

Inhibitor 105 is an inhibitor used for reactive clays which is a mixture of chemicals designed for control of high reactivity clay intervals. Concentration within fluid 101 is 2 liters/m3 to 50 liters/m3 depending on the formation. The main features of this product are:

Control of formation swelling (Linear Swell);
Dispersion of unstable areas such as sandstone and illite;
Encapsulation of colloidal solids with small grain size; and
Vastly enhanced lubricity in the fluid system (ROP control).

Mixture 107 is a mixture of amines that provides control of acid gases such as CO2, H2S, and methane in the hydrocarbon producing areas. It also provides control of pH (alkalinity in the drilling fluid system). Mixture 107 is in a concentration of 2 liters/m3 to 25 liters/m3 within fluid 101, depending on the formation.

If the fluid 101 needs to be densified to control pressure gradients higher than 1.20, calcium carbonate can be added so as not to damage productive areas. Furthermore, in the case of production areas with gradients up to 1.70, the system can be densified further with simple or complex brines with a high molecular weight with no damage to the production zone. In non-productive hydrocarbon intervals with a pressure gradient greater than 1.0, fluid 101 can be densified with barite (barium sulfate).

Figure 3:
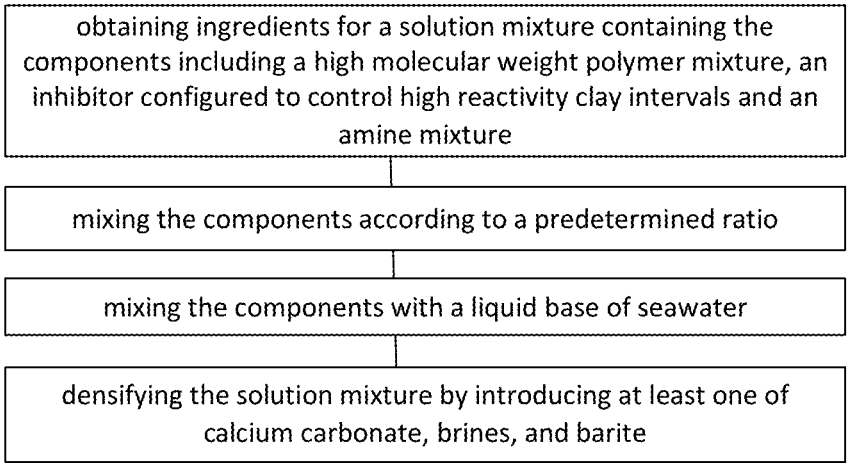
FIG. 3 is a chart of a method of generating the drilling fluid of FIG. 1.

Referring now also to FIG. 3 in the drawings, a method of forming an aqueous solution for drilling wells in low-gradient formations is illustrated. The method includes obtaining ingredients for a solution mixture containing the components of a high molecular weight polymer mixture, an inhibitor configured to control high reactivity clay intervals, and an amine mixture. These components are mixed according to a predetermined ratio. The mixed components are then combined with a liquid base of seawater. The combined mixture can be densified by introducing at least one of calcium carbonate, brines, and barite.

Some exemplary oil/gas fields most suited for the characteristics of fluid 101 are located at approximately 113 KM northeast of Ciudad del Carmen, specifically in territorial waters of the Gulf of Mexico. These can be found between the geographical coordinates of 92° 13'9.727" West Longitude and 19° 35'22.736" North Latitude.

The naturally fractured condition in these fields presents itself in only a few parts of the world. The challenge in drilling here lies in the fact that there are no returns of the drilling fluid to the surface and thus cuttings do not travel from the bottom of the well up to the solids control equipment. For this reason, the cleanliness of the well is uncertain. In addition, the formations contain vugular zones with highly reactive clays. These specific challenges are addressed by fluid 101.

A fundamental factor to avoid operating issues is the correct selection of the drilling fluid. Fluid 101 is a seawater-based fluid that provides many advantages compared to the fluids that were previously used. For example, due to its liquid additives, fluid 101 can be generated on board without the need of mud ship to transport fluid to location. This makes drilling under bad weather conditions possible as mud ships can be extremely affected by weather on open water. Fluid 101 being made on site helps to maintain operations at the well independent of weather. By maintaining operating continuity, the risk of the drill string getting stuck (stuck pipe) is notably reduced.

Furthermore, the individual solutions and mixtures in fluid 101 also makes it is possible to drill several wells in the deposit layer simultaneously. This is partly due to the ease of stocking the materials needed to generate the mud used with fluid 101. There is also higher chemical and mechanical stability in the formation as fluid inhibitors 105 are very efficient. This stability helps considerably improve the torque and entrainment operating conditions. Likewise, improved cleaning of the pit is realized as the seawater-based fluid 101 has a better rheology than the muds that were previously used.

The issues and disadvantages of prior art fluids previously discussed were reflected in the inability to achieve the set in and cementing of the lining tubes at the programmed depth. Generally, an average of 35 drilling days were required to complete this operation. Additional problems during drilling can be attributed to:

Lack of supply of drilling water and diesel;
Instability of the drilled well due to dispersion and swelling of the argillaceous necks;
High torque in the BHA (Bottom Hole Assembly);
Tearing in the drill pipe and need for consequent side tracks;
NPT (Non Productive Time) due to lack of well stability and bad weather conditions; and High costs due to the use of supply ships that transported drilling water, diesel, and solid materials.

However, the fluid of the present application is part of a system wherein the drilling fluid is based on liquid mixtures of 3 components and is made with seawater as a base. This is different from the current systems using 5 components. Less components facilitates operational and logistical costs benefits.

Fluid 101 is used in a drilling system includes many features and capabilities not realized with conventional prior art systems. The system is designed to drill with partial or total circulation loss. Additionally, quick preparation time of 60 m3 to 80 m3 per 30 minutes may be achieved, resulting in operating continuity. This is partly due to the number of components in fluid 101 but also the type of components. As noted previously with each component in fluid 101, control of reactive clays is a benefit to fluid 101. Control of reactive clays with more than 35 meq/100 g is realized. Likewise, fluid 101 helps to stabilize the well wall due to control of unstable argillaceous materials.

Another feature is that fluid 101 helps to reduce Coefficient of Lubricity to less than 0.15, whereas prior art conventional systems have higher coefficients in the range of 0.18 to 0.25. This benefits the drill operation by needing to generate lower torque.

Furthermore, fluid 101 helps in the control and encapsulation of the fine solids generated in the drilling operation. It is designed to drill high pressure intervals and can be densified with densifying materials or high molecular weight brines when needed.

Fluid 101 is a seawater-based solution used in a system that is for the drilling of highly reactive areas, among them Paleocene, Cretaceous, and Jurassic. Fluid 101 substitutes invert emulsion and was designed to control swelling, dispersion, and migration of fine colloidal materials, and the system can drill high pressure gradient intervals and can be formulated to resolve any challenge presented by the formation. Use of fluid 101 within the system of the present application provides many advantages, namely, at least the following:

Quick preparation—the polymeric liquid components are designed to develop its physicochemical properties on a seawater base at rates of up to 80 m3/30 min;

Can be used in drilling, completion, and workover of wells;

Due to quick integration of its 3 components, the system has a high capacity to drill deposits with depressurized areas of total or partial circulation loss;

The system has a flat rheology profile which improves removal of cuttings;

The current drilling systems used in the Gulf of Campeche designated as BAMIL, (liquid inhibitor seawater base systems) at best control argillaceous materials containing up to 20 meq/100 g of reactive clays. The system of the present application with fluid 101 can drill in areas with high reactivity of 35 meq/100 g of argillaceous materials, which is a challenge primarily in the Paleocene layers;

Quick logistics—Fluid 101, made up of 3 liquid components, facilitates the logistics on the Gulf of Mexico platforms as it only requires one ship to transport its materials. There is a reduction in expenses due to the elimination of specialized transport of diesel and drilling water used in conventional oil-based fluids;

It is possible to store fluid 101 and its components on conventional platforms due to the low footprint of the 3 components in totes;

Quick drilling—There will be improved control of the ROP, as the system has a low lubricity coefficient of 0.12 or lower if required;

The system and fluid 101 have the capacity to control aggressive pollutants from the different formations to be pierced such as acid gases H2S, CO2, and it is compatible with cementing system operations;

Drilling in productive zones requires polymeric materials completely soluble in 15% wt hydrochloric acid. Fluid 101 is completely acidifiable, as the damages to the productive formation are entirely removable with nitrogen induction and stimulation of the well. The system does not emulsify with hydrocarbons and therefore does not interfere with stimulation operations;

The system and fluid is compatible with production zone hydrocarbons;

The system and fluid is environmentally friendly and does not harm sea life. It complies with the environmental standards required to drill in the Gulf of Mexico. The system complies with LC-50 and CRETIB tests and the lack of nonmetallic materials in its composition make it suitable to drill in the Gulf of Mexico.

The particular embodiment disclosed above is illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An aqueous solution for drilling wells in low-gradient formations, comprising:
    a liquid base, the liquid base being seawater;
    a polymer mixture having a multifunctional modified polysaccharide polymer;
    an inhibitor configured to control high reactivity clay intervals;
    an amine mixture;
    a quantity of calcium carbonate to handle pressure gradients higher than 1.20, the calcium carbonate configured to add density to the solution; and
    a quantity of at least one of simple brines and complex brines to handle pressure gradients up to 1.70, the simple and complex brines configured to add density to the solution.

2. The solution of claim 1, wherein the high molecular weight polymer mixture is in concentration within the range of 0.5 liters/m3 to 12 liters/m3.

3. The solution of claim 1, wherein the inhibitor is in concentration within the range of 2.0 liters/m3 to 50 liters/m3.

4. The solution of claim 1, wherein the inhibitor is configured to minimize formation swelling.

5. The solution of claim 1, wherein the inhibitor is configured to minimize lubricity.

6. The solution of claim 1, wherein the inhibitor is configured to encapsulate colloidal solids with relatively small grain size.

7. The solution of claim 1, wherein the amine mixture is in concentration within the range of 2 liters/m3 to 25 liters/m3.

8. The solution of claim 1, wherein the amine mixture is configured to regulate the pH in a fluid system.

9. The solution of claim 1, further comprising:
a quantity of at least one of simple brines and complex brines to handle pressure gradients up to 1.70, the simple and complex brines configured to add density to the solution.

10. The solution of claim 1, further comprising:
a quantity of barite to handle pressure gradients greater than 1.0, the barite configured to add density to the solution.

11. The solution of claim 1, wherein the aqueous solution is configured to lower the coefficient of lubricity to less than 0.15.

12. An aqueous solution for drilling wells in low-gradient formations, comprising:
a liquid base, the liquid base being seawater;
a polymer mixture in concentration within the range of 0.5 liters/m3 to 12 liters/m3 and having a multifunctional modified polysaccharide polymer;
an inhibitor configured to control high reactivity clay intervals, the inhibitor is in concentration within the range of 2.0 liters/m3 to 50 liters/m3;
an amine mixture in concentration within the range of 2 liters/m3 to 25 liters/m3;
a quantity of calcium carbonate to handle pressure gradients higher than 1.20,
the calcium carbonate configured to add density to the solution; and
a quantity of at least one of simple brines and complex brines to handle pressure gradients up to 1.70, the simple and complex brines configured to add density to the solution.

13. A method of forming an aqueous solution for drilling wells in low-gradient formations, comprising:
obtaining ingredients for a solution mixture containing the components including a polymer mixture having a multifunctional modified polysaccharide polymer, an inhibitor configured to control high reactivity clay intervals and an amine mixture;
mixing the components according to a predetermined ratio;
mixing the components with a liquid base of seawater at site of the drilling well; and
densifying the solution mixture by introducing a quantity of calcium carbonate, brines, and barite;
passing the aqueous solution through the drilling well without a return for solids.

14. The method of claim 13, wherein the solution mixture includes:
a polymer mixture in concentration within the range of 0.5 liters/m3 to 12 liters/m3;
an inhibitor configured to control high reactivity clay intervals, the inhibitor is in concentration within the range of 2.0 liters/m3 to 50 liters/m3;
an amine mixture in concentration within the range of 2 liters/m3 to 25 liters/m3;
a quantity of calcium carbonate to handle pressure gradients higher than 1.20, the calcium carbonate configured to add density to the solution; and
a quantity of at least one of simple brines and complex brines to handle pressure gradients up to 1.70, the simple and complex brines configured to add density to the solution.

* * * * *